Figure 2:
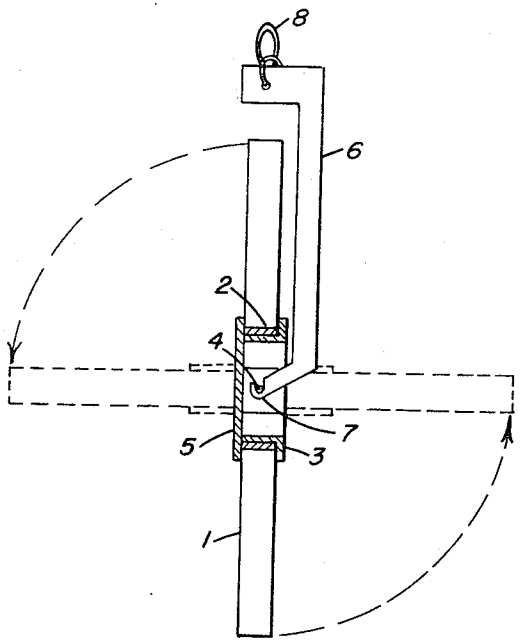
Figure 1:
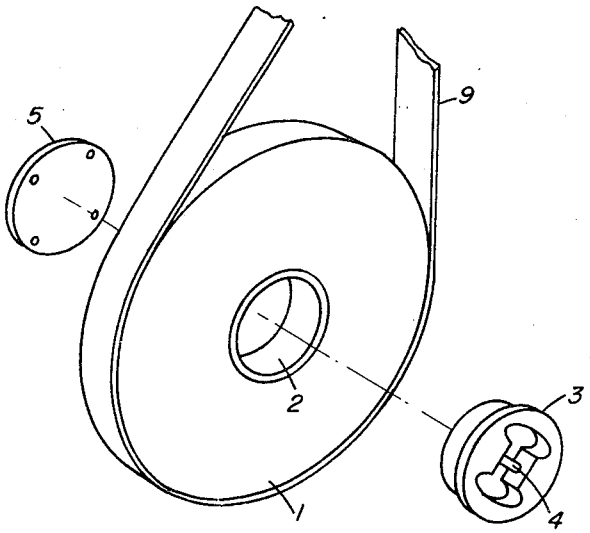

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 23, 1970

875 O.G. 383

T875,022

APPARATUS FOR TILTING WOUND ROLLS

Heinz C. Altmann, 58 Bristol Ave.; Clifford B. Bushnell, 746 Oakridge Drive; and Henry L. West, 169 Rosemont Drive, all of Rochester, N.Y. 14617

Filed Oct. 13, 1969, Ser. No. 865,578

**Int. Cl. B65g *69/00***

U.S. Cl. 214—1

1 Sheet Drawing. 5 Pages Specification

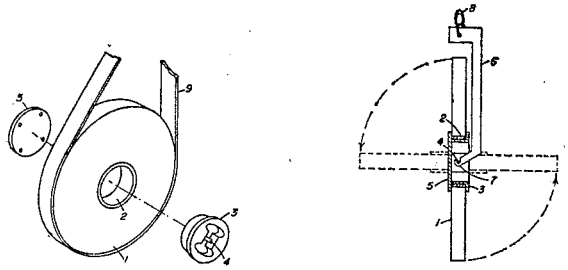

A large roll of web material (1) having a core (2) may be tilted by securing a core insert (3) within the core (2). The insert (3) has a tilt bar (4) which is pivotally engageable with a hook (7) on a lift bar (6). The roll is removed from a winding machine by means of a sling (9), or the like; then the hook (7) is engaged with the bar (4) and the roll tilted about bar (4), so that the rotary axis of the roll becomes vertical, to facilitate roll handling. The tilt bar could also be part of the core, or part of the core insert.

June 23, 1970 H. C. ALTMANN ET AL T875,022

APPARATUS FOR TILTING WOUND ROLLS

Filed Oct. 13, 1969

HEINZ C. ALTMANN
CLIFFORD B. BUSHNELL
HENRY L. WEST
INVENTORS

BY Walter O. Hodsdon
Robert F. Cody
ATTORNEYS